Figure 1:
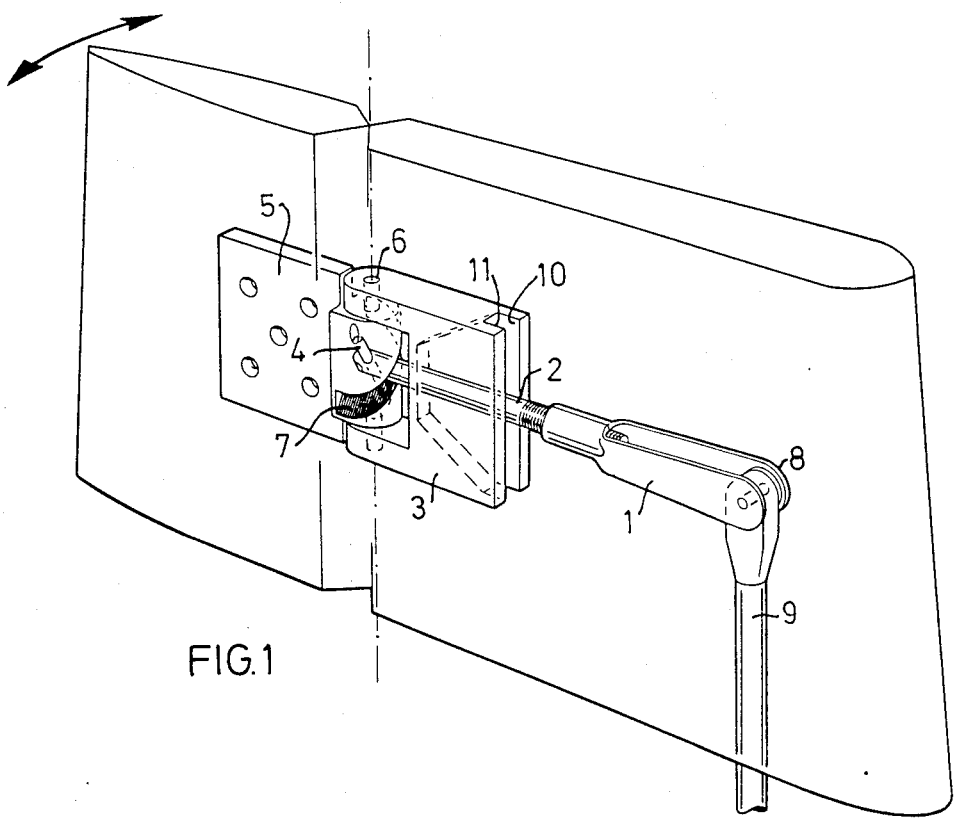

United States Patent [19]

Hollman

[11] Patent Number: 4,531,417
[45] Date of Patent: Jul. 30, 1985

[54] HINGE-TYPE ANGLE SETTING DEVICE

[76] Inventor: Nils D. Hollman, Trollsländevägen 10, S-12537 Älvsjö, Sweden

[21] Appl. No.: 385,402
[22] PCT Filed: Sep. 29, 1981
[86] PCT No.: PCT/SE81/00281
 § 371 Date: May 20, 1982
 § 102(e) Date: May 20, 1982
[87] PCT Pub. No.: WO82/01230
 PCT Pub. Date: Apr. 15, 1982

[30] Foreign Application Priority Data

Sep. 29, 1980 [SE] Sweden .............................. 8006794

[51] Int. Cl.³ ......................... F16H 21/54; B64C 3/58
[52] U.S. Cl. ........................................ 74/96; 244/213
[58] Field of Search ................... 74/96, 107; 46/76 R, 46/77; 244/75 R, 213, 215, 9 R

[56] References Cited

U.S. PATENT DOCUMENTS

| | | | |
|---|---|---|---|
| 1,040,479 | 10/1912 | Winton | 74/96 |
| 1,466,664 | 9/1923 | Lowe | 74/96 |
| 1,804,765 | 5/1931 | Gwinn | 244/90 R |
| 1,901,827 | 3/1933 | Stokes et al. | |
| 2,508,057 | 5/1950 | Bishop | 74/96 |
| 2,679,367 | 5/1954 | Pribil et al. | 74/96 |
| 3,774,463 | 11/1973 | Heintz | 74/96 |

FOREIGN PATENT DOCUMENTS

| | | | |
|---|---|---|---|
| 1000161 | 10/1951 | France | 74/96 |
| 1392727 | 2/1965 | France | 244/213 |
| 1477512 | 4/1967 | France . | |
| 486749 | 6/1938 | United Kingdom . | |
| 734959 | 8/1955 | United Kingdom . | |
| 870689 | 6/1961 | United Kingdom . | |
| 1397076 | 6/1975 | United Kingdom | 74/96 |

OTHER PUBLICATIONS

I. I. Artobolevsky, *Mechanisms in Modern Engineering Design*, vol. IV, p. 156.

Primary Examiner—Lawrence J. Staab
Attorney, Agent, or Firm—Pollock, Vande Sande & Priddy

[57] ABSTRACT

The invention relates to an angle setting device of hinge type, especially for use in model airplanes. Two hinge members (3,5) are jointed to each other via pins (6). An actuator (1) is pivotable, and the swing angle of the hinge can be set by the pivoting of the actuator (1). This is achieved by the actuator being mechanically controlled (10,11) in the first hinge member (3) along a certain surface, as well as being mechanically controlled (4,7) along a second surface in the second hinge member (5), said two surfaces forming an angle with each other.

4 Claims, 5 Drawing Figures

HINGE-TYPE ANGLE SETTING DEVICE

The invention relates to an angle setting device of hinge type, with a first member and a second member which is rotatable about an axis relative to the first member.

The device in question is initially intended for setting the rudder, flaps and elevators in a model airplane, but the principle of the invention is also applicable in other cases where one wishes to control the swinging of a hinged object, e.g., for controlling ventilation covers. The applicability is extensive.

In model airplanes it is usual to set the rudder and flaps etc., by radio control, with some form of controlled motor being used to achieve the changing setting. As a rule, the setting is achieved by fixing a lever to a hinged member, such as a rudder or flap, and then actuating the lever by an often complicated linkage. As a rule, the lever must protrude outside the plane of the flap. As regards flaps and the like in a wing, there is the further problem that the actuating force must be transmitted via a linkage lying inside the wing and acting in the longitudinal direction of the wing, in order to actuate a lever arm fixed to the flap to swing in a plane essentially perpendicular to the linkage. This is difficult to achieve without a large number of bearing points with play. This play is cumulative in effect.

The major purpose of the present invention is therefore to achieve an angle setting device of hinge type, which is more practical and efficient.

A special purpose of the invention is to achieve a mechanical control means which converts a translational movement in one direction into a rotational movement about an axis essentially parallel to said translational movement. The control means should be easily and inexpensively manufactured and be suitable for use in model airplanes, for example.

This is achieved according to the invention by an angle setting device of the type mentioned in the introduction characterized by an actuator which is pivotally mounted on the second member about a point of attachment and disposed to pivot along a first guide surface, the movement of the actuator in the second member being limited to a second guide surface, which forms an angle with the first guide surface, so that the pivoting of the actuator causes a relative rotational movement between first and the second members.

According to a preferred embodiment, the hinge members are made of plastic, the first member, intended for fixed mounting in a model airplane, for example, having a slotted opening the two walls of which fit against the actuator and force it to move within the planar slot. The other hinge member is fixed to a movable prt (rudder flap etc.) and can swing about axial pins. Between the axial pins there is a slot into which the end of the actuator is fitted and is fixed by a pin driven through the actuator perpendicular to the slot.

A different arrangement of the two guide surfaces is possible. The pin and slot in the second hinge member can be replaced by a shaft. Alternatively, the actuator can be journalized on a pin in the first hinge member and run freely in a slot in the other hinge member. This slot need not be straight. In this way a suitable varying mechanical advantage can be achieved over the operating interval.

The invention will now be described with reference to the drawings.

Figure 2:
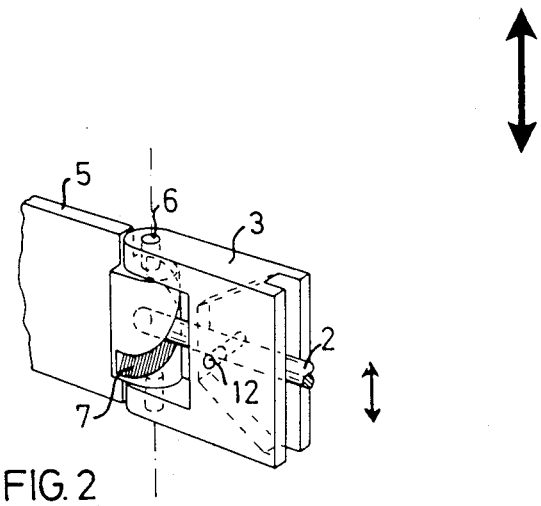
Figure 3:
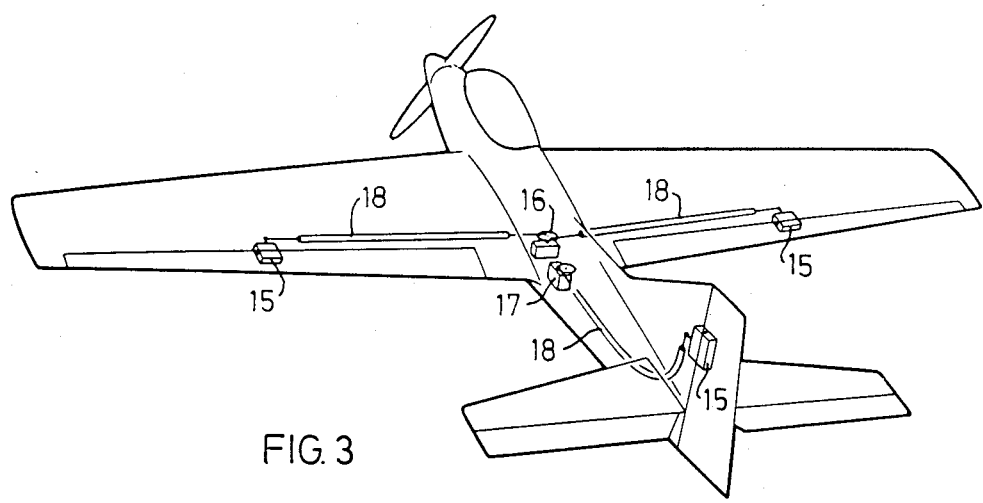
Figure 4:
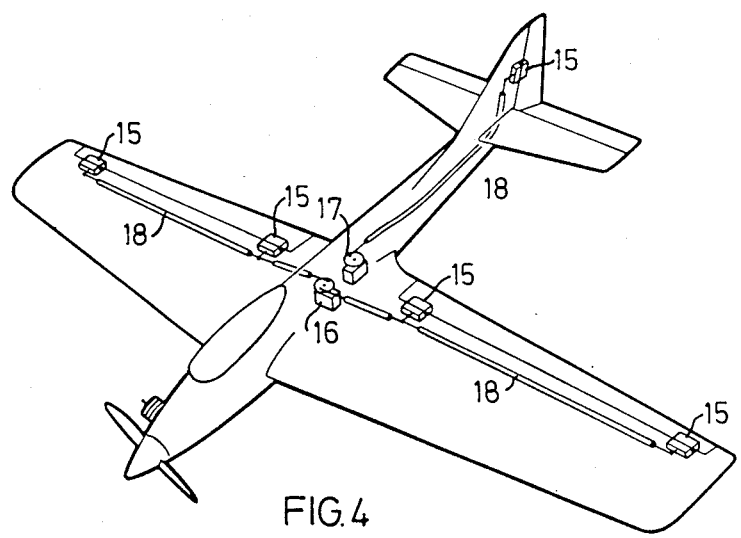
Figure 5:
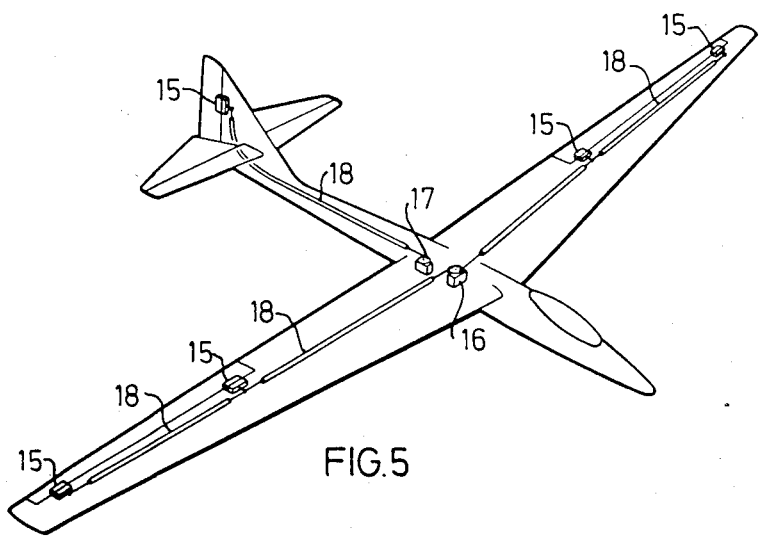

FIG. 1 shows a controlled hinge.
FIG. 2 shows another embodiment of a controlled hinge.
FIGS. 3 and 4 show model airplanes provided with steering means based on the invention.
FIG. 5 shows a corresponding glider.

The example shown in FIG. 1 shows the presently preferred embodiment of an angle setting device of hinge type, which is mounted on a wing, of which only a portion is shown. The hinge has two members 3 and 5, the first of which is fixed to the wing itself and the second of which is fixed to a flap which is swingable relative to the wing. The two members are articulated via pins 6 and the movement is regulated by an actuator 1 which is pivoted via a joint 8 and a connecting rod 9, coupled to a control apparatus (not shown). The actuator 1 comprises a round metal rod 2 which is articulated at one end via a pin 4 fixed in the second member and forming an angle with the rotation of axis of the latter. Furthermore, the rod 2 is guided by two flat surfaces 10,11 which form a slot in the first member 3, which should suitably be co-planar with the pins 6. Similar surfaces 7 are arranged in the second member 5, which form a slot defining a plane which is at an angle to the slot in the first member. As can be seen from FIG. 1, movement of the connecting rod 9 in its longitudinal direction will result in restricted pivoting of the rod 2 in the plane defined by the surfaces 10,11. This will cause the second hinge member to rotate about the pins 6.

FIG. 2 shows schematically another embodiment, in which identical reference numerals designate analogous elements. In this case, the rod 2 is pivotable about a pin 12 and moves in an obliquely arranged slot 7 in the member 5. The result is the same as in the embodiment shown in FIG. 1.

Essential to the invention is thus that the actuator 1 be mechanically guided along individual surfaces in the two hinge members, said surfaces being at an angle to each other. In the example shown, these surfaces are planar surfaces, but so as they can also be curved surfaces. By suitable computation of the surfaces, it is possible to obtain a suitable relation between the dependent and the independent pivoting. It is also possible to make this relation non-linear to take into account aerodynamic variables, i.e., a wing flap swung downwards producing a greater secondary effect than one swung upwards.

As will be evident, mechanical guidance along a surface also includes rotation about an axis, whereby a plane of rotation is defined.

FIGS. 3, 4 and 5 show methods of arranging angle setting devices according to the invention. Adjustable wing flaps are arranged by angle setting devices 15. Although they are not shown, it is recommended to also install common, uncontrolled hinges. The figures show that control means 16 for the wing flaps and 17 for the rudder can be radio control means well-known to those skilled in the art, and therefore not described in more detail here. These control means actuate control rods corresponding to rod 9 in FIG. 1. In order to obtain a light contruction, they are suitably made according to the Bowden cable principle by being drawn through stiff tubes 18. As can be seen from the rudder control in FIGS. 3, 4 and 5, it is also possible to curve their lines of action.

It can be seen from the figures that the angle setting device 15 for the wing flaps should be of identical construction so that, for example, when the control cables of both wings are pulled in, the flaps will be swung down. If, however, banking is desired in this construction, the devices should be reversed.

I claim:

1. Angle setting device with a hinge joint defining a rotational axis, comprising
   (a) a first member (3) provided with an actuator (1, 2) pivotally mounted at a point of attachment (4; 12) and limited in its movement in said first member by a first guide surface (10, 11); and
   (b) a second member (5) rotatable about said rotational axis relative to said first member (3) by moving said actuator, said actuator being limited in its movement in said second member by a second guide surface (7) which forms an angle with said first guide surface, said limitation of movement by said second guide surface being arranged by said actuator (1) being journalled on the pin (4) fixed in said second member (5) and forming an angle with said rotational axis,
   (c) said second member (5) being essentially fixed relative to said first member (3) in the direction of said rotational axis, whereby pivoting of said actuator causes relative rotational movement between said first and second members.

2. Angle setting device according to claim 1, wherein said first guide surface is constituted by two parallel planar surfaces (10, 11) in said first member (3), between which guide surfaces the actuator (1) is fitted.

3. Angle setting device according to claim 1, wherein said limitation of movement by said second guide surface is arranged by said actuator being fitted between two guide surfaces (7) arranged in said second member.

4. Angle setting device according to claim 1, wherein said two guide surfaces form an angle of 25°–60° with each other.

* * * * *